(12) United States Patent
Reinhardt

(10) Patent No.: US 7,425,123 B2
(45) Date of Patent: Sep. 16, 2008

(54) HYDRAULIC MOLD CLAMPING UNIT

(75) Inventor: Thomas Reinhardt, Aying (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 215 days.

(21) Appl. No.: 11/278,716

(22) Filed: Apr. 5, 2006

(65) Prior Publication Data

US 2006/0233912 A1  Oct. 19, 2006

(30) Foreign Application Priority Data

Apr. 19, 2005  (DE) .................. 10 2005 017 878

(51) Int. Cl.
*B29C 33/24* (2006.01)
*B29C 45/67* (2006.01)

(52) U.S. Cl. .................... 425/150; 425/169; 425/450.1; 425/589

(58) Field of Classification Search ................. 425/150, 425/169, 589, 595, 450.1, 451.9, 590, 451.2
See application file for complete search history.

(56) References Cited

U.S. PATENT DOCUMENTS

| 4,235,088 A | 11/1980 | Kreiskorte |
| 4,924,671 A | 5/1990 | Reinert |
| 5,395,565 A | 3/1995 | Nagaoka et al. |
| 5,852,933 A * | 12/1998 | Schmidt ...................... 60/413 |
| 6,250,905 B1 * | 6/2001 | Mailliet et al. .............. 425/589 |
| 6,527,540 B1 * | 3/2003 | Dantlgraber ................ 425/589 |

FOREIGN PATENT DOCUMENTS

| DE | 102 02 374 A1 |   | 7/2003 |
| JP | 62-44418 | * | 2/1987 |
| JP | 06039842 A |   | 2/1994 |
| JP | 2003-21103 | * | 1/2003 |

* cited by examiner

*Primary Examiner*—James Mackey
(74) *Attorney, Agent, or Firm*—Henry M. Feiereisen

(57) ABSTRACT

A hydraulic mold clamping unit, in particular for an injection molding machines or a press, includes a fixed lower platen and an upper plated which is moved by an open-close mechanism in a vertical direction. The open-close mechanism includes at least one hydraulic cylinder of a first type having a double-acting piston, and at least one hydraulic cylinder of a second type. A hydraulic pump system is operatively connected to both sides of the hydraulic cylinder of first type, and a pressure accumulator is operatively connected to the hydraulic cylinder of second type. In order to realize an energy-efficient operation of the upper platen at little pressure build-up, a proportional or regulation valve is disposed in the pump system for modifying a back pressure in the hydraulic cylinder of first type, when closing the lower and upper platens.

17 Claims, 1 Drawing Sheet

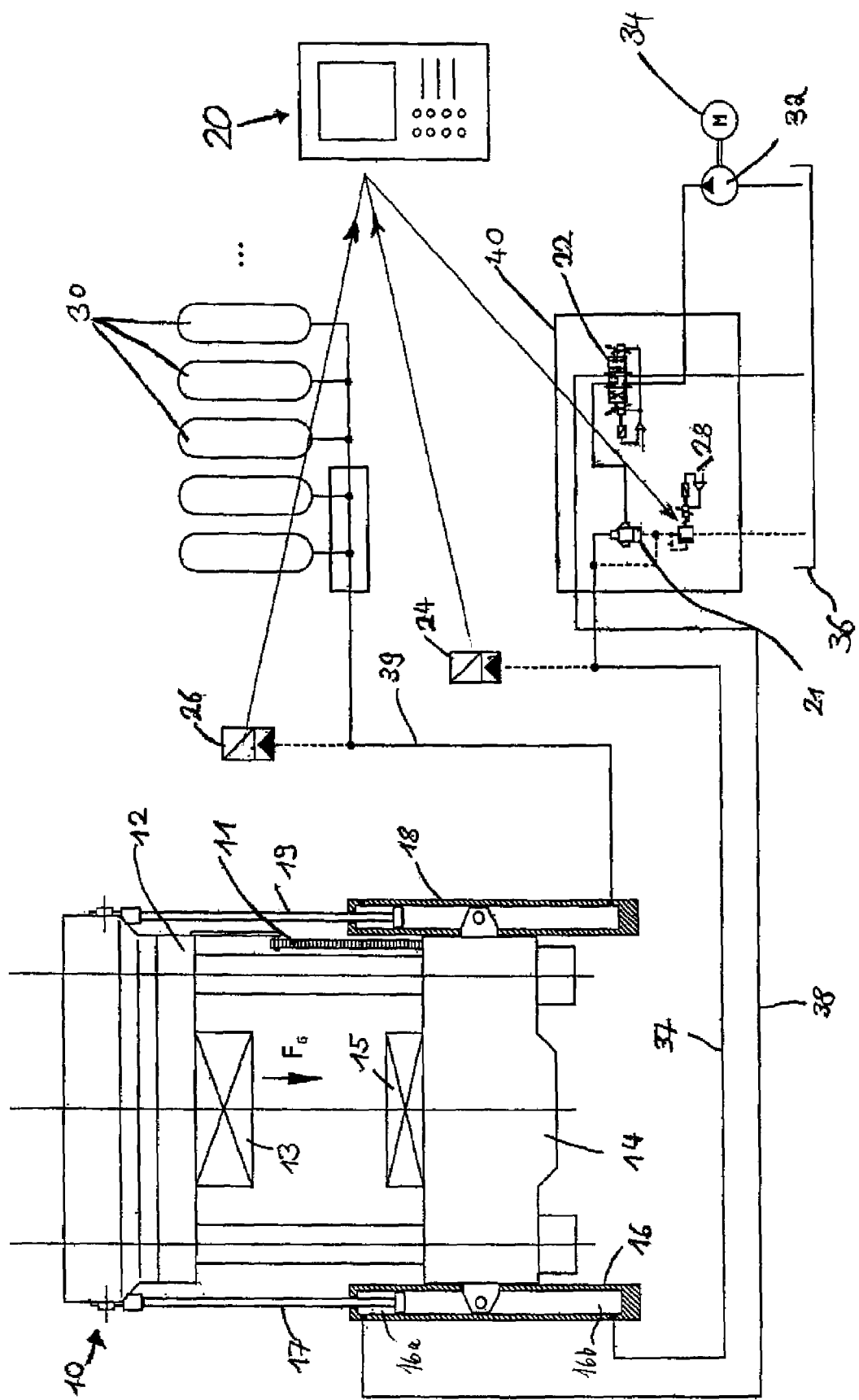

HYDRAULIC MOLD CLAMPING UNIT

CROSS-REFERENCES TO RELATED APPLICATIONS

This application claims the priority of German Patent Application, Serial No. 10 2005 017 878.2-14, filed Apr. 19, 2005, pursuant to 35 U.S.C. 119(a)-(d), the content of which is incorporated herein by reference.

BACKGROUND OF THE INVENTION

The present invention relates, in general, to a mold clamping unit.

Nothing in the following discussion of the state of the art is to be construed as an admission of prior art.

Vertical mold clamping units are used for opening and closing a mold and maintaining the mold in open and closed dispositions. Typically, operation of the mold clamping unit involves a conveyance of hydraulic oil under a certain pressure level between a hydraulic cylinder and a pressure accumulator, and between a hydraulic cylinder and a pump system. When the mold clamping unit is in open position of the mold, the weight force of the moved mass is partly absorbed by the cylinder piston of the hydraulic cylinder that is connected to the pressure accumulator, while the other part of the weight force is held by the hydraulic cylinder that is connected to the pump system. When, the mold is to be closed, the mold clamping unit has to overcome these pressures. In the hydraulic cylinder that is connected to the accumulator, an accumulator pressure acts on the fluid only in the lower pressure space. This pressure resultant from the pressure accumulator is preset and can normally not be influenced.

The pressure applied by the pump system for maintaining the mold clamping unit in open position is typically predefined heretofore by a preset pressurizing valve, normally a hand-operated pressure relief valve, which sets a specified limit for the back pressure. The term "back pressure" relates hereby to the pressure in the lower pressure space of the hydraulic cylinder that is connected to the pump system. This construction of the pressurizing valve is only able to operate at a fixed specified limit, whereby the limit must be chosen high enough to ensure a secure holding of the weight force of the platen even when the mold is fully opened. The operating pressure that builds up in the upper pressure space of the hydraulic cylinder that is connected to the pump must be chosen high enough to be able to overcome the back pressure as well as the pressure in the other hydraulic cylinder when closing the mold. This construction requires generation of a high operating pressure for closing of the mold clamping unit so that the power consumption of the hydraulic system is significant and causes in substantial energy consumption. Moreover, hydraulic components such as conduits, seals, pump, motor etc., must be dimensioned accordingly for such a high pressure.

It would therefore be desirable and advantageous to provide an improved mold clamping unit which obviates prior art shortcomings and which operates efficiently and at low pressures.

SUMMARY OF THE INVENTION

According to one aspect of the present invention, a hydraulic mold clamping unit, in particular for an injection molding machine or a press, includes a fixed lower platen, an upper platen, an open-close mechanism for moving the upper platen in a vertical direction in relation to the fixed platen, with the open-close mechanism including at least one hydraulic cylinder of a first type having a double-acting piston, and at least one hydraulic cylinder of a second type, a hydraulic pump system constructed for operative connection to both sides of the hydraulic cylinder of first type, a pressure accumulator operatively connected to the hydraulic cylinder of second type, and a valve disposed in the pump system for modifying a back pressure in the hydraulic cylinder of first type, when the lower and upper platens are closed.

The present invention resolves prior art problems by constructing a mold clamping unit such as to allow adjustment of the back pressure so that energy consumption can be reduced overall. Moreover, the required operating pressure can be reduced, at least temporarily. As a consequence, the use of lighter hydraulic components, e.g. pump, conduits, etc. becomes possible. In addition, there is no need for re-adjustment when changing the mold as the system is able to automatically adjust to different mold weights and resultant weight forces.

According to another feature of the present invention, the valve may be a proportional valve or a regulation valve. Suitably, the. valve can be operated by a control unit which receives pressure signals from pressure sensors, whereby one pressure sensor may be provided for determining a hydraulic pressure in the hydraulic cylinder of first type (direct measurement) or in a feed line to the hydraulic cylinder of first type (indirect measurement), and another pressure sensor may be provided for determining a hydraulic pressure in the hydraulic cylinder of second type (direct measurement) or in a feed line to the hydraulic cylinder of second type(indirect measurement). These pressure signals are inputted into the control unit for subsequent processing. For example, the control unit may be constructed to ascertain a differential between the pressure signals and to compare the differential with a desired value stored in a table in the control unit for example. A control signal is generated as a result of the comparison for activating the valve accordingly.

According to another feature of the present invention, the pump system may include a motor and a pump which can also be controlled so that the control unit is able to deliver respective signals to the pump system.

According to another feature of the present invention, the open-close mechanism of the mold clamping unit may include two hydraulic cylinders of first type, and two hydraulic cylinders of second type. Suitably the two hydraulic cylinders of first type and the two hydraulic cylinders of second type are arranged in diagonal relationship. This ensures a synchronous and jerk-free operation.

According to another feature of the present invention, the pressure accumulator may include a plurality of single tanks that are interconnected in series. In this way, hydraulic fluid, e.g. oil, can be made available continuously at same quantities in the hydraulic cylinder of second type.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE is a schematic illustration of mold clamping unit according to the present invention.

DETAILED DESCRIPTION OF PREFERRED EMBODIMENTS

The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the FIGURE, there is shown a schematic illustration of mold clamping unit according to the present invention, generally designated by reference numeral 10 and including a fixed lower platen 14, which carries a lower mold 15, and an upper platen 12 which is movable in vertical direction in relation to the lower platen 14 and carries an upper mold 13. When the mold is closed, the upper and lower molds 13, 15 define a cavity in which plastic melt for example can be injected from an unillustrated plasticizing device or, while the mold is still open a pre-fabricated plastic mat can be placed into the open mold by hand or robot.

The vertical mobility of the upper platen 12 is implemented by an open-close mechanism which includes two hydraulic cylinders 16 of a first type (only one is shown in the FIGURE) and two hydraulic cylinders 18 of a second type (only one is shown in the FIGURE), whereby the hydraulic cylinders 16 and the hydraulic cylinders 18 are disposed in diagonal relationship. Each hydraulic cylinder 16 accommodates a hydraulic piston 17, and each hydraulic cylinder 18 accommodates a hydraulic piston 19, whereby the hydraulic pistons 17, 19 are connected to the upper platen 12. Each hydraulic piston 17 is hereby constructed as double-acting piston so that the hydraulic cylinders 16 have an upper pressure chamber 16a and a lower pressure chamber 16b.

Reference numeral 11 designates a displacement pickup 11 for ascertaining an actual position of the upper platen 12.

The hydraulic cylinders 16 are in fluid communication via hydraulic lines 37 and hydraulic lines 38 with a hydraulic block 40 of a pump system. The hydraulic block 40 includes an insert valve 21, also called cartridge valve, which can be connected to a control valve 22 and a proportional or pressure regulation valve 28 which is provided for pressure reduction and fluidly connected to a storage tank 36 for hydraulic oil. The lower pressure chambers 16b of the hydraulic cylinders 16 are connected or connectable via the hydraulic lines 37 through intervention of the insert valve 21 and the control valve 22 to a pump 32 or the storage tank 36. Pressure in the hydraulic lines 37 is determined by a pressure sensor 24 which is disposed in the hydraulic line between the hydraulic cylinders 16 and the hydraulic block 40 and delivers a commensurate pressure signal to a control unit 20. The pump 32 and the storage tank 36 form part of the pump system which is located outside the hydraulic block 40, with the pump 32 being operated by a motor 34.

The upper pressure chambers 16a of the hydraulic cylinders 16 are connected by the hydraulic lines 38 directly to the control valve 22.

The insert valve 21 operates as primary control valve, and the proportional or regulation valve 28 operates a pilot control valve and receives commands from the control unit 20 to control and regulate the insert valve 21.

The hydraulic cylinders 18 are in fluid communication with a hydraulic pressure accumulator 30 via a hydraulic line 39. The pressure accumulator 30 is comprised of a plurality of single tanks which are interconnected in series. A further pressure sensor 26 is disposed in the hydraulic line 39 between the hydraulic cylinders 18 and the accumulator 30 for ascertaining the pressure in this pressure circuit and delivering a commensurate pressure signal to the control unit 20.

The pressure signals from the pressure sensors 24, 26 are processed in the control unit 20 which compares the pressure signals with predefined desired values. In particular, the control unit 20 determines a pressure differential between the determined pressures by the pressure sensors 24, 26 and generates a control signal for the proportional or regulation valve 28 in response to the determined pressure differential. In addition, the motor 34 may also be constructed controllable to receive commands from the control unit 20.

Thus, the back pressure in the lower pressure chamber 16b of the hydraulic cylinders 16 can be controlled to ensure a safe opening of the mold clamping unit 1 and to maintain the mold clamping unit in open position, on one hand, and to realize a closing of the mold clamping unit in an energy efficient way.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. A hydraulic mold clamping unit, comprising:
   a fixed lower platen;
   an upper platen defined by a weight force;
   an open-close mechanism for moving the upper platen in a vertical direction in relation to the fixed platen, said open-close mechanism including at least one hydraulic cylinder of a first type having a double-acting piston, wherein the hydraulic cylinder of first type has one side constructed for holding part of the weight force of the upper platen, and at least one hydraulic cylinder of a second type including a single-acting piston and having one side constructed for holding another part of the weight force of the upper platen;
   a hydraulic pump system constructed for operative connection to both sides of the hydraulic cylinder of first type;
   a pressure accumulator operatively connected to the one side of the hydraulic cylinder of second type; and
   a valve disposed in the pump system for modifying a back pressure in the hydraulic cylinder of first type, when clamping the lower and upper platens.

2. The hydraulic mold clamping unit of claim 1, wherein the valve is a proportional valve.

3. The hydraulic mold clamping unit of claim 1, wherein the valve is a pressure regulation valve.

4. The hydraulic mold clamping unit of claim 1, further comprising a pressure sensor for determining a hydraulic pressure in the hydraulic cylinder of first type.

5. The hydraulic mold clamping unit of claim 4, wherein the pressure sensor determines the hydraulic pressure in a feed line to the hydraulic cylinder of first type.

6. The hydraulic mold clamping unit of claim 1, further comprising a pressure sensor for determining a hydraulic pressure in the hydraulic cylinder of second type.

7. The hydraulic mold clamping unit of claim 6, wherein the pressure sensor determines the hydraulic pressure in a feed line to the hydraulic cylinder of second type.

8. The hydraulic mold clamping unit of claim 1, further comprising a control unit for controlling operation of the valve.

9. The hydraulic mold clamping unit of claim 8, further comprising a first pressure sensor for transmitting a first pressure signal, commensurate to a hydraulic pressure determined in the hydraulic cylinder of first type, to the control unit for subsequent processing, and a second pressure sensor for transmitting a second pressure signal, commensurate to a hydraulic pressure determined in the hydraulic cylinder of second type, to the control unit for subsequent processing.

10. The hydraulic mold clamping unit of claim 1, wherein the pump system includes a controllable pump and a drive unit for operating the pump.

11. The hydraulic mold clamping unit of claim 10, further comprising a control unit operatively connected to the pump system for transmitting a control signal to the pump system.

12. The hydraulic mold clamping unit of claim 9, wherein the control unit is constructed to perform a comparison of the first and second pressure signals with predefined desired values.

13. The hydraulic mold clamping unit of claim 9, wherein the control unit is constructed to determine a differential between the first and second pressure signals and to perform a comparison of the differential with a predefined desired value.

14. The hydraulic mold clamping unit of claim 12, wherein the control unit is constructed to generate an operating signal as a consequence of the comparison between the first and second pressure signals with predefined desired values for controlling the pump system.

15. The hydraulic mold clamping unit of claim 1, wherein the open-close mechanism includes two of said hydraulic cylinder of first type, and two of said hydraulic cylinder of second type.

16. The hydraulic mold clamping unit of claim 15, wherein the two hydraulic cylinders of first type and the two hydraulic cylinders of second type are arranged in diagonal relationship.

17. The hydraulic mold clamping unit of claim 1, wherein the pressure accumulator includes a plurality of single tanks which are interconnected in series.

* * * * *